(12) United States Patent
Ginter

(10) Patent No.: US 6,564,556 B2
(45) Date of Patent: May 20, 2003

(54) HIGH EFFICIENCY LOW POLLUTION HYBRID BRAYTON CYCLE COMBUSTOR

(76) Inventor: J. Lyell Ginter, c/o Miss. Dian Ginter, 2683 Holly Vista Blvd., Highland, CA (US) 92346

( * ) Notice: Subject to any disclaimer, the term of this patent is extended or adjusted under 35 U.S.C. 154(b) by 0 days.

(21) Appl. No.: 10/161,159

(22) Filed: May 30, 2002

(65) Prior Publication Data

US 2003/0014959 A1 Jan. 23, 2003

Related U.S. Application Data

(63) Continuation of application No. 09/645,986, filed on Oct. 27, 2000, now abandoned, which is a division of application No. 09/042,231, filed on Mar. 11, 1998, now Pat. No. 6,289,666, which is a continuation-in-part of application No. 08/232,047, filed on Apr. 26, 1994, now Pat. No. 5,743,080, which is a continuation-in-part of application No. 07/967,289, filed on Oct. 27, 1992, now Pat. No. 5,617,719.

(51) Int. Cl.[7] .................................................. F02C 3/30
(52) U.S. Cl. ........................ 60/775; 60/39.55; 60/39.26
(58) Field of Search ............................ 60/39.55, 39.26, 60/39.3, 760, 775, 773, 794

(56) References Cited

U.S. PATENT DOCUMENTS

| | | | |
|---|---|---|---|
| 4,474,014 A | 10/1984 | Markowski | 60/738 |
| 4,519,769 A | 5/1985 | Tanaka | 431/4 |
| 5,513,488 A | 5/1996 | Fan | |
| 6,289,666 B1 | 9/2001 | Ginter | 60/39.05 |

OTHER PUBLICATIONS

Pchelkin, Yu. M., Combustion Chambers of Gas–Turbine Engines, Moscow, "Mashinostroyenie" (Mechanical Engineering) Publishing House, 1973, title page, pp. 162–164 and p. 172.

Primary Examiner—Charles G. Freay
(74) Attorney, Agent, or Firm—Ostrolenk, Faber, Gerb & Soffen, LLP

(57) ABSTRACT

A power generating system and method operating at high pressure and utilizing a working fluid consisting of a mixture of compressed non-flammable air components, fuel combustion products and steam. The working fluid is substantially free of CO and $NO_x$. Fuel and compressed air at an elevated temperature and at a constant pressure are delivered to a combustion chamber, the amount of air being chosen so that at least about 90% of the oxygen in the air is consumed during combustion. The quantity of air and fuel supplied to the combustion chamber may be varied provided a constant fuel to air ratio is maintained. Superheated water is delivered under pressure to the combustion chamber, and is converted substantially instantaneously to steam. The quantity of water delivered is controlled such that the latent heat of vaporization of the water maintains the temperature of the working fluid at a desired level. Heat may be transferred from the working fluid exiting the work engine to the water to heat the water to the desired temperature for delivery to the combustion chamber. The quantity, temperature and pressure of the air, fuel and water introduced in to the combustion chamber are independently controllable. A zoned burner may be employed in which a portion of the compressed air may be mixed with the fuel in a first zone prior to ignition, with the remaining compressed air being added at one or more locations downstream of the point of ignition.

11 Claims, 7 Drawing Sheets

HIGH EFFICIENCY LOW POLLUTION HYBRID BRAYTON CYCLE COMBUSTOR

CROSS REFERENCE TO RELATED APPLICATIONS

The present application is a continuation of U.S. application Ser. No. 09/645,986, filed Oct. 27, 2000, now abandoned, in the name of J. Lyell Ginter and entitled HIGH EFFICIENCY LOW POLLUTION HYBRID BRAYTON CYCLE COMBUSTOR which is a division of U.S. application Ser. No. 09/042,231 filed Mar. 11, 1998 now U.S. Pat. No. 6,289,666, which is a continuation-in-part of U.S. application Ser. No. 08/232,047 filed Apr. 26, 1994 now U.S. Pat. No. 5,743,080 issued Apr. 28, 1998 which is a continuation-in-part of application Ser. No. 07/967,289, now U.S. Pat. No. 5,617,719 filed Oct. 27, 1992 all of which are incorporated by reference.

FIELD OF THE INVENTION

The present invention is directed to a vapor-air steam engine which operates at high pressure and utilizes a working fluid consisting of a mixture of fuel combustion products and steam with a minimal amount of excess compressed air. The invention is further directed to processes for producing electrical energy, usable shaft horsepower and/or large quantities of steam in a fuel burning system at high efficiency and low specific fuel consumption, while generating insignificant amounts of environmental pollutants ($NO_x$, CO, particulates, unburned fuel). The invention is still further directed to the production of potable water while generating electrical power without polluting the environment or significantly reducing the efficiency or increasing the fuel consumption.

BACKGROUND OF THE INVENTION

Internal combustion engines are generally classified as either constant volume or constant pressure. Otto cycle engines operate by exploding volatile fuel in a constant volume of compressed air while diesel cycle engines burn fuel in a modified cycle, the burning being approximately characterized as constant pressure.

External combustion engines are exemplified by steam engines, steam turbines and gas turbines. It is well known to supply a gas turbine with a gaseous working fluid generated by combusting a fuel with compressed air and to operate various motor devices from energy stored in this high pressure gaseous stream. In these devices, temperature control is usually the result of feeding large quantities of excess compressed air.

It is also known to burn fuel in a chamber and exhaust the combustion products into a working cylinder or chamber, sometimes with the injection of small quantities of water or steam. These may also be classified as external combustion engines.

Some other devices have been proposed in which combustion chambers are cooled by addition of water or steam provided either internally or externally. Still another form of apparatus has been proposed for operation on fuel injected into a combustion cylinder as the temperature falls, having means to terminate fuel injection when the pressure reaches a desired value.

Each of these prior engines has encountered difficulties which limit their general adoption as a power source for the operation of prime movers. Among these difficulties have been the inability of such an engine to meet sudden demand and/or to maintain a constant working temperature or pressure as may be required for efficient operation of such an engine.

Furthermore, control of such engines has been inefficient, and the ability of the gas generator to maintain itself in standby condition has been wholly inadequate. In all practical applied engine configurations the requirement for cooling the confining walls of the work cylinders has resulted in loss of efficiency and a number of other disadvantages previously inherent in internal combustion engines.

The present invention overcomes the limitations of the prior art described above. First, the requirement of large amounts of excess compressed air or external liquid cooling is eliminated by injecting water directly into the combustion chamber to control the temperature of the resulting working fluid. When water is injected it is converted instantaneously into steam in the combustion chamber, and it becomes a component of the working fluid itself, thus increasing the mass and volume of the working fluid without mechanical compression.

In the present invention, independent control of the a) combustion flame temperature b) combustion chamber temperature profile by liquid water injection and c) fuel to air ratio allows the physical properties of the working fluid to be optimized for high efficiency operation. Reducing or eliminating excess air, thus limiting the availability of excess oxygen, and controlling the flame temperature and combustor temperature profile also prevents the formation of $NO_x$, and favors the complete conversion of burning fuel to $CO_2$, minimizing CO production.

The present invention also utilizes high pressure ratios as a way of increasing efficiency and horsepower while simultaneously lowering specific fuel consumption ("SFC"). When water is injected and converted into steam in the combustion chamber of the present invention, it acquires the pressure of the combustion chamber. It should be noted that the pressure of the combustion chamber is acquired by the steam irrespective of the pressure ratio of the engine. Thus, a higher pressure ratio can be obtained in the engine without expending additional work for performing compression for new steam or water injection. Because of the injection of massive amounts of water in the present invention, there is no need to compress more air than needed for combustion, this excess air typically used in prior art systems for cooling. The elimination of this requirement results in an enormous energy savings to the system and a significant increase, without additional consumption of fuel, in the available shaft horsepower without increasing turbine speed.

Water injection, as taught in the present invention, provides several advantages over the prior art. First, a minimal amount of additional work is required to pressurize water above the combustion chamber pressure. In steam injection system significant work must be expended to raise the steam to a pressure above that of the combustion chamber. Likewise, excess air requires additional work be expended to raise the feed air to higher pressures to produce additional working fluid mass. Furthermore, when water is injected and converted to steam in the present invention, it acquires the pressure of the combustion chamber without additional work. This steam also has constant entropy and enthalpy.

In the present invention excess (waste) heat from combustion is used to convert injected water to steam, thus increasing the working fluid pressure and mass of the working fluid without mechanical compression of excess air. In contrast, in a typical Brayton Cycle Turbine, 66%–75% of the mechanically compressed air is used to dilute the products of combustion in order to reduce the temperature of the working fluid to the desired Turbine Inlet Temperature ("TIT").

The steam generated by vaporization of the injected water can at least double the mass of the combustion generated working fluid and increase the net horsepower by 15% or more. Therefore, the water can be seen to serve as a fuel in this new thermodynamic system because it supplies pressure, mass, and energy to the system, resulting in an increased efficiency of the present system.

The cycle of the present invention may be open or closed with respect to water. That means that the air and water may be exhausted (open) or recovered and recycled (closed). Desalination or water purification can be a byproduct of electric power generation from a stationary installation or water borne ships, where the cycle is open as to air but closed as to the desalinated water recovery. Marine power plants, industrial applications, drinking water and irrigation water clean up and recovery systems are also viable applications.

The present cycle can also be employed in the closed cycle phase in mobile environments, e.g. autos, trucks, buses, rail locomotives, marine craft, commuter aircraft, general aviation and the like.

SUMMARY OF THE INVENTION

One of the objectives of this invention is to provide a new, thermodynamic power cycle, which can operate in an open or closed mode, that compresses a stoichiometric amount of air and combusts fuel with the air so as to provide efficient, clean, pollution free power.

It is also an object of this invention to completely control the temperature of combustion within a combustor through the employment of the latent heat of vaporization of water without the necessity to mechanically compress excess (dilution) air for cooling.

A further object of this invention is to reduce the air compressor load in relation to a power turbine used in the engine so that a smaller compressor can be used and slow idling and faster acceleration can be achieved.

A further object of this invention is to separately control the turbine inlet temperature (TIT) on demand.

Another object of this invention is to vary the composition and temperature of the working fluid on demand.

It is also an object of this invention to provide sufficient dwell time of the reactants in the combustion chamber to permit stoichiometric combustion, chemical bonding, and time for complete reaction and quenching, resulting in chemical equilibrium.

It is also an object of this invention to combust and cool the products of combustion in a manner which will prevent the formation of smog causing components such as $NO_x$, unburned fuel, CO, particulates, $CO_2$ dissociation products, etc.

It is also an object of this invention to provide a combustion system with 100% conversion of one pound of chemical energy to one pound of thermal energy.

It is also an object of this invention to operate the entire power system as cool as possible and still operate with good thermal efficiency.

It is also an object of this invention to provide a condensing process in order to cool, condense, separate, and reclaim the steam as condensed, potable water.

It is also an object of this invention to provide an electric power generating system which uses nonpotable water as its coolant and produces potable water as a byproduct of the electric power generation.

It is also an object of this invention to provide a new cycle which alternatively provides a modified Brayton cycle during one mode of engine operation, a vapor air steam cycle during a second mode of engine operation and a combined cycle during a third mode.

It is also an object of this invention to provide a combustor for use with any turbine power generating system such that the power system produces electrical energy at a greater efficiency and reduced specific fuel consumption when compared with currently available systems using currently available combustors.

It is also an objective of this invention to provide a combustor which can be retrofit into current hydrocarbon fuel burning systems replacing currently used combustors and eliminating the need for pollution abatement equipment (catalytic converts, reburns, scrubbing systems) while increasing operating efficiency and decreasing pollution in exhaust streams.

It is also an object of the invention to provide a turbine power generation system which provides significantly increased usable shaft power (net usable power) when compared with a Brayton cycle system burning an equivalent amount of fuel.

It is also an object of this invention to provide a power generating system which produces electrical energy at an overall efficiency significantly greater than 40%.

It is also an objective to provide a power generating system which burns hydrocarbon fuels in a more efficient manner to produce less green house gases ($CO_2$).

It is also an objective to efficiently provide large quantities of steam at any temperature and pressure desired.

In accordance with one exemplary embodiment of the present invention, referred to as the VAST cycle, an internal combustion engine is described. This engine includes a compressor configured for compressing ambient air into compressed air having a pressure greater than or equal to six atmospheres, and having an elevated temperature. A combustion chamber connected to the compressor is configured for staged delivery of compressed air from the compressor to the combustion chamber. Separate fuel and liquid injection controls are used for injecting fuel and liquid water respectively into the combustion chamber as needed and where needed. The amount of compressed air, fuel and water injected, the pressure of the compressed air, fuel and water injected, the temperature of the compressed air and fuel injected, and the temperature of the injected water and the point of injection into the combustor are each independently controlled. As a result, the average combustion temperature and the fuel to air ratio (F/A) can also be independently controlled. The injected fuel and a controlled portion of the compressed air are combusted, and the heat generated transforms the injected water into a vapor. When the injected water is transformed into a vapor the latent heat of vaporization of the water reduces the temperature of the combustion gases exiting the combustor. An amount of water significantly greater than the weight of the combusted fuel is used. However, the mass of air feed to the system is significantly reduced. As a result, the mass flow of combustion generated working fluid maybe varied from 50% to greater than 200% of mass flows in current systems using the same amount of fuel under most operating conditions.

A working fluid consisting of a mixture of a small amount of the unburnable 79% non-oxygen components of the compressed air, fuel combustion products and water vapor is thus generated in the combustion chamber during combustion at a predetermined combustion temperature and combustor temperature profile. Substantially all of the temperature control is provided by the latent heat of vaporization of the water. Any excess is provided only to assure complete combustion and is not provided for cooling purposes. This working fluid can then be supplied to one or more work engines for performing useful work. Alternatively, the working fluid, which is high temperature, high pressure steam can be used directly, such as injection in oil wells to increase flow, as a heat source for distillation towers or other equipment which utilize steam for operation.

In more specific embodiments of the present invention, an ignition sparker is used to start the engine. The engine may also be operated either open or closed cycle; in the latter case, a portion of the working fluid exhaust may be recuperated. The flame temperature and combustion chamber temperature profile are monitored using temperature detectors and thermostats located throughout the combustor.

Further, a computerized feedback control system may be used to monitor the gaseous components of the exhaust stream and operating conditions and feed rates can be automatically adjusted to minimize $NO_x$ and CO in the exhaust.

When the present invention is used, the combustion temperature is reduced by the combustion control means so that stoichiometric combustion and chemical reaction equilibrium are achieved in the working fluid. All chemical energy in the injected fuel is converted during combustion into thermal energy and the vaporization of water into steam creates cyclonic turbulence that assists molecular mixing of the fuel and air such that more complete combustion is effectuated. The injected water absorbs all the excess heat energy, reducing the temperature of the working fluid to the maximum desired operating temperature of the work engine. When the injected water is transformed into steam, it assumes the pressure of the combustion chamber, without additional work for compression and without additional entropy or enthalpy. The careful control of combustion temperature prevents the formations of gases and compounds that cause or contribute to the formation of atmospheric smog and, by virtue of the increased operating efficiency, reduces the amount of green house gases generated per usable energy produced.

In another embodiment of the present invention, electric power is generated using nonpotable water as its coolant, potable water being produced as a byproduct of the power or steam generation.

In a third embodiment of the present invention (a new cycle) the engine can operate in three different modes. When the engine is operated in excess of a first predetermined rpm (i.e. at a high RPM), water injection and the amount of compressed air combusted is kept constant as engine rpm increases. At an interim RPM, i.e. between a first (high) and second (low) predetermined rpm, the water to fuel ratio is increased as the amount of excess air is decreased. When the engine is operated at various speeds below a second predetermined rpm (i.e. a low RPM), the ratio of injected water to fuel is held constant and the amount of compressed air combusted is held constant, excess air being substantially eliminated.

The use of this new cycle results in increased horsepower at a lower rpm, slow idle, fast acceleration and combustion of up to 95% of the compressed air at low rpm.

A more complete understanding of the invention and further objects and advantages thereof will become apparent from a consideration of the accompanying drawings and the following detailed description. The scope of the present invention is set forth with particularity in the appended claims.

DETAILED DESCRIPTION OF THE INVENTION

A. Basic Configuration of the Present System

Figure 1:
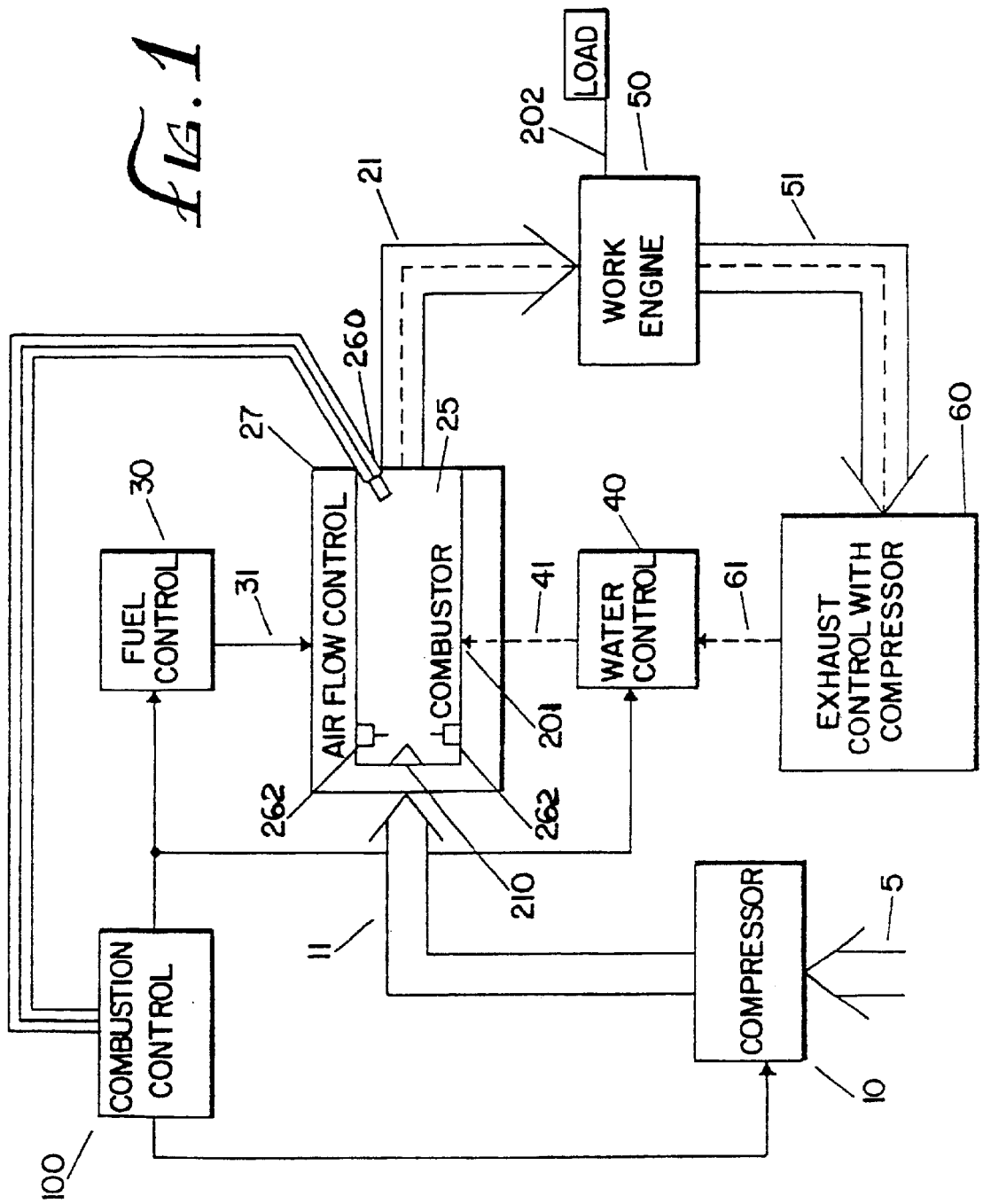
FIG. 1 is a block diagram of a vapor-air steam turbine engine in accordance with a present invention.

Referring now to FIG. 1, there is shown schematically a gas turbine engine embodying the teachings of the present invention. Ambient air 5 is compressed by compressor 10 to a desired pressure resulting in compressed air 11. In a preferred embodiment, compressor 10 is a typical well-known two or three stage compressor, and the ambient air 5 is compressed to a pressure greater than about four (4) atmospheres, and preferably 10 to 30 atmospheres. The temperature of the compressed air depends on the compression ratio. At a compression ratio of 30:1 the compressed air temperature is approximately 1424° R (964° F.).

The flow of the compressed air 11 is controlled by an air flow controller 27 to a combustor 25. Combustors are well-known in the art. However, in the present invention, the compressed air 11 is supplied in a staged, circumferential manner by air flow control 27 to the combustor 200 shown in FIG. 2 and more fully described below. The staged feed of the air allows controlling and limiting of combustion temperature (flame temperatures) throughout the combustion chamber 25. The normally high peak temperatures are reduced while still generating the same total energy output from the combustion.

Fuel 31 is injected under pressure by fuel injection control 30. Fuel injection control is also well-known to skilled artisans. The fuel injection control 30 used in the present invention can consist of a series of conventional single or multiple fuel feed nozzles. A pressurized fuel supply (not shown) is used to supply fuel, which can be any conventional hydrocarbon fuel, such as diesel fuel #2, heating oil, preferably sulfur free, well head oil, propane, natural gas, gasoline and alcohols such as ethanol. Ethanol may be preferable in some applications because it includes or can be mixed with at least some water which may be used for cooling combustion products, thus reducing the requirement for injected water. Also ethanol water mixtures have a much lower freezing point thus increasing the ability to use the engine in climates which have temperatures below 32° F.

Water 41 is injected under pressure and at a preset but adjustable rate by a pump controlled by water injection control 40 and may be atomized through one or more nozzles, into the feed air stream, downstream of combustion into combustion chamber 25 or into the flame if desired as explained further below.

The temperature within combustor 25 is controlled by combustion controller 100 operating in conjunction with other elements of the present invention detailed above. Combustion controller 100 may be a conventionally programmed microprocessor with supporting digital logic, a microcomputer or any other well-known device for monitoring and effectuating control in response to feedback signals from monitors located in the combustion chamber 25, the exhaust stream 51 (expanded working fluid 21) or associated with the other components of the present system.

For example, pressure within combustor 25 can be maintained by air compressor 10 in response to variations in engine rpm. Temperature detectors and thermostats 260 (only one is shown for clarity) within combustor 25 provide temperature information to combustion control 100 which then directs water injection control 40 to inject more or less liquid water as needed. Similarly, working fluid mass is controlled by combustion control 100 by varying the mixture of fuel, water and air combusted in combustor 25.

There are certain well-known practical limitations-which regulate the acceptable maximum combustion temperature. Foremost among these considerations is the maximum turbine inlet temperature (TIT) which can be accommodated by any system. To effectuate the desired maximum TIT, water injection control 40 injects water as needed to the working fluid 21 to keep the combustion temperature within acceptable limits. The injected water absorbs a substantial amount of the combustion flame heat through the latent heat of evaporation of such water as it is converted to steam at the pressure of combustor 25.

For ignition of the fuel injected into combustor 25, a pressure ratio of greater than 12:1 is needed to effectuate self-compression ignition. However, a standard ignition sparker 262 can be used with lower pressure ratios.

As mentioned above, combustion controller 100 independently controls the amount of combusted compressed air from air flow control 27, fuel injection control 30, and water injection control 40 so as to combust the injected fuel and substantially all of the oxygen in the compressed air. At least 95% of oxygen in the compressed air is combusted. If less than 100% of the $O_2$ is combusted then sufficient $O_2$ is available to complete stoichiometric bonding and for acceleration. When 100% of the air is consumed in the combustion process, forming $CO_2$, no oxygen is available to form $NO_x$. The heat of combustion also transforms the injected water into steam, thus resulting in a working fluid 21 consisting of a mixture of compressed, non-combustible components of air, fuel combustion products and steam being generated in the combustion chamber. Pressure ratios from about 4:1 to about 100:1 may be supplied by compressor 10. TIT temperatures may vary from 750° F. to 2300° F. with the higher limit being dictated by material considerations. However, a higher TIT can be provided if the turbine is fabricated from materials, such as ceramics or other refractory materials, which can resist higher temperatures.

A work engine 50, typically a turbine, is coupled to and receives the working fluid 21 from combustion chamber 25 for performing useful work (such as by rotating a shaft 54 for example) which, in turn, drives a load such as a generator 56, which produces electric energy 58, or the air compressor 10. While the present invention discusses the use of a turbine as a work engine, skilled artisans will appreciate that reciprocating, Wankel, cam or other type of work engines may be driven by the working fluid created by the present invention.

Because of pressure differences between the combustor 25 interior and the turbine exhaust, the working fluid expands as it passes by work engine 50. The expanded working fluid 51 is exhausted by exhaust control 60 at varying pressure, generally from 0.1 atmospheres to about 1 atm. depending on whether a closed cycle with vacuum pump or open cycle is used. However, higher exhaust pressures are possible. Exhaust control 60 may also include a heat exchanger 63 and/or condenser 62 for condensing the steam 61 from the expanded working fluid 51 as well as a recompressor 64 for exhausting the expanded working fluid 51. The steam condensed in condenser 62 exits as potable water 65.

Figure 2:
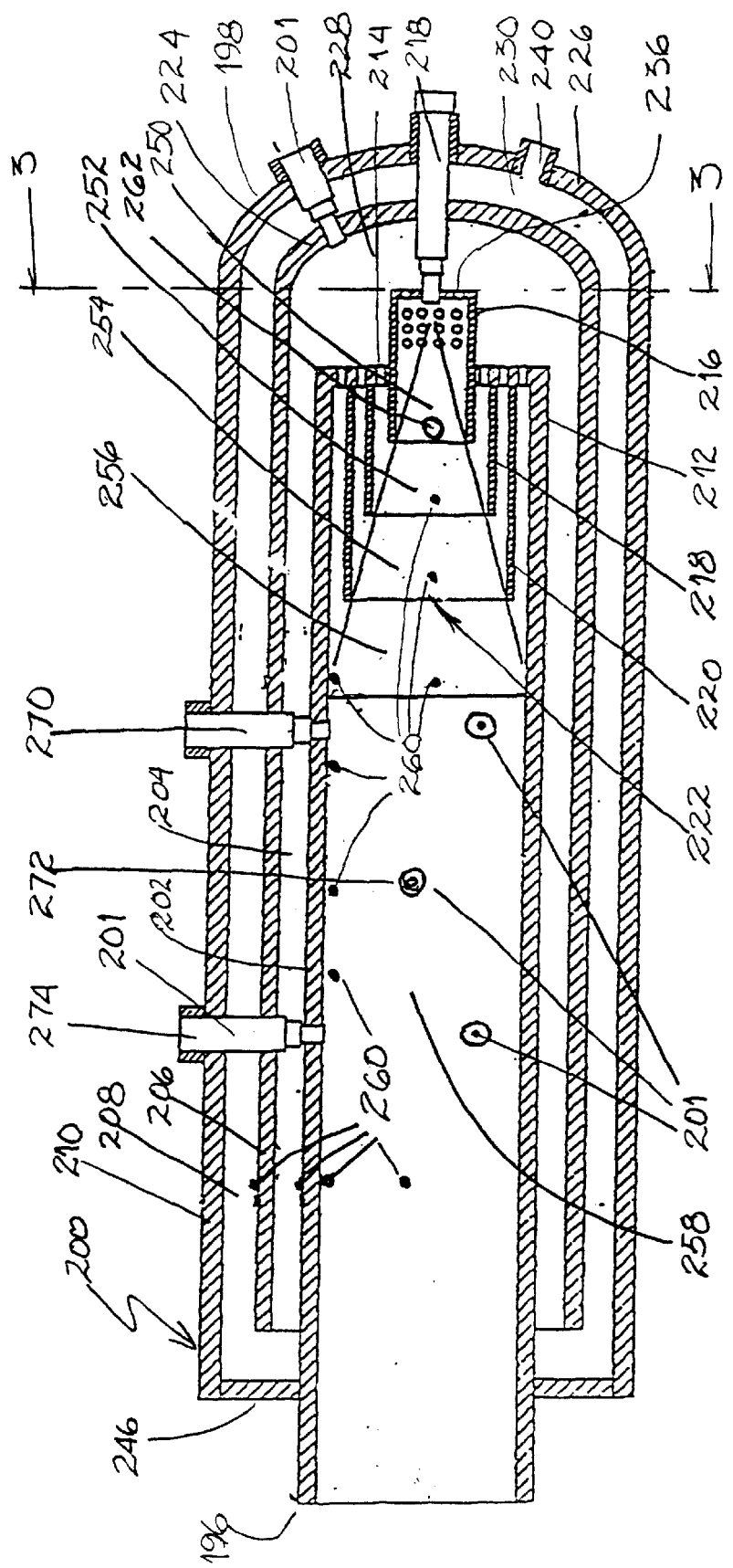
FIG. 2 is a schematic diagram of a preferred combustor.

FIG. 2 shows a schematic diagram of a preferred combustor 200, which incorporates features of the invention, having an inlet end 198 and an exhaust end 196. In the embodiment shown the combustor comprises three concentric stainless steel tubes 202, 206, 210 and inlets for air, water and fuel. The inner tube 202 is the longest of the tubes, the middle tube 206 is the shortest tube and the outer tube 210 is of an intermediate length. The inner or central tube 202, in a particular embodiment, has an inner diameter of 5 inches and a wall thickness of about ½". There is approximately a one inch air flow space between each of the inner tube 202, the middle tube 206 and the outer tube 210 (the inner air flow space 204 and the outer air flow space 208, respectively). The inlet end of the middle tube 206 and the outer tube 210 each have a hemispheric head 224, 226 connected to the circumference of each respectively to form a closed space 228, 230 contiguous with the space between the tubes 204, 208, crating a flow path, as described below, from the exterior of the combustor 200, through the space between the outer tube 210 and middle tube 206 (the outer air flows space 208) and then between the middle tube 206 and the inner tube 202 (the inner air flow space 204) and through burner 214.

Figure 3:
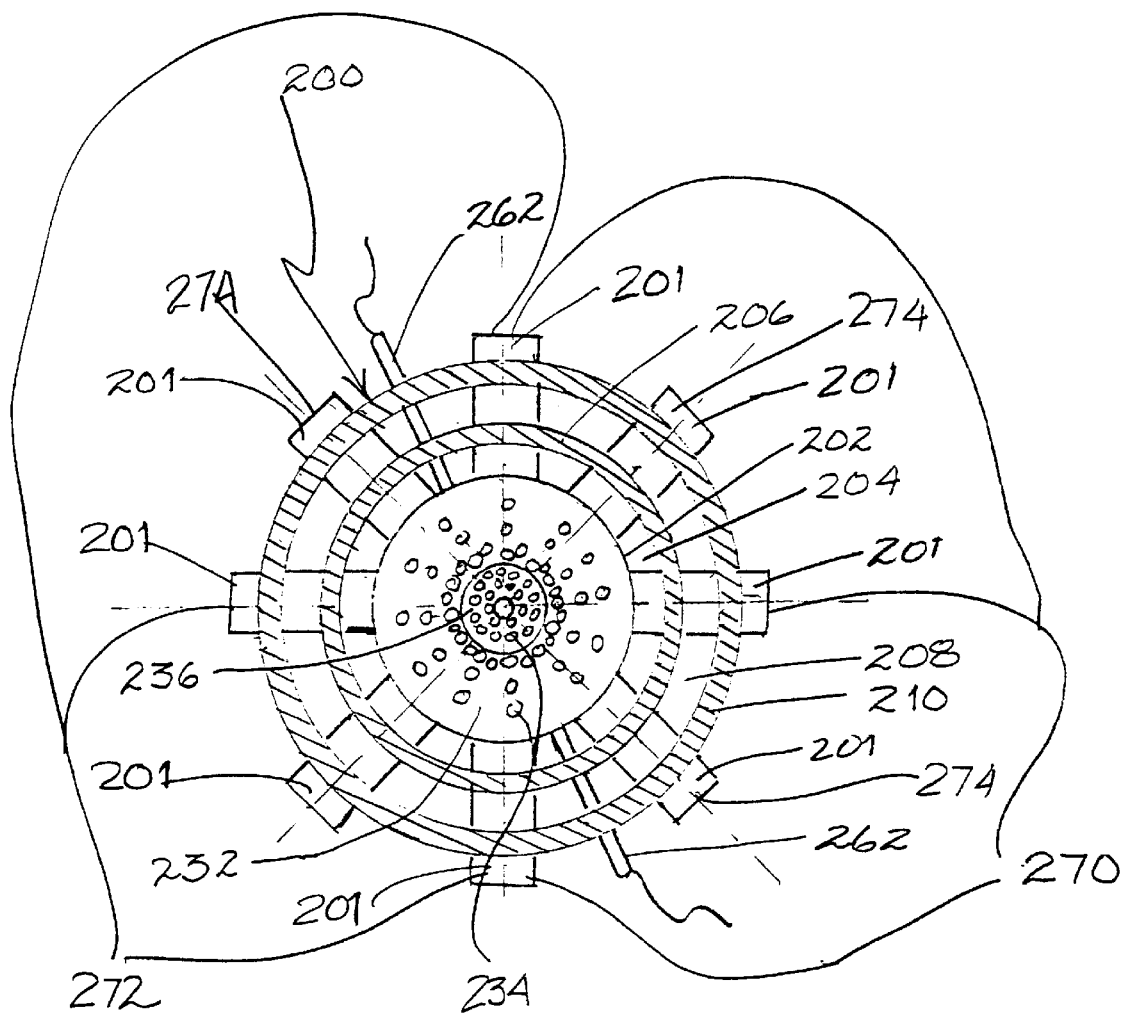
FIG. 3 is a cross-sectional view along line 3—3 of FIG. 2.

Covering the inlet end or head 212 of the inner tube 202, as shown in FIG. 3, is an air feed plate 232 to which are attached nested tubes which comprise the burner 214. Burner 214 is formed by three concentric tubes with the inner fire tube 216 being 2 inches in diameter, the central fire tube 218 being about 3 inches in diameter and the outer fire tube 220 being about 4 inches in diameter. The fire tubes 216, 218, 220 are progressively longer in length so that a straight line connecting the internal ends thereof form a flame containment cone 222 with an angle of the cone 222 being from about 50 to 90 degrees.

The inlet end of the central fire tube 216 extends into the air feed chamber 228 formed between the hemispheric head 224 on the middle tube 206 and the inlet end of the central tube 202. As shown in FIG. 3, a second air feed plate 236 with holes 234 therein covers the inlet end of the inner fire tube 216. In addition, holes 234 are distributed around and through the periphery of the outer surface of the inner fire tube 216 where it extends into the air feed chamber 228. Centrally located and passing through the hemispheric heads 224, 226 and the second air feed plate 236 is a fuel injection nozzle 218 positioned to deliver fuel from the exterior of the combustor 200 into the inlet end of other inner fire tube 216 where the fuel is mixed with the air passing into the inner fire tube 216.

Air for combustion is fed at the desired pressure through one or more air inlets 240 in the outer hemispheric head 226. The air then flows along the outer air flow space 208 between the middle tube 206 and outer tube 210 from the inlet end 198 to the exhaust end 196 where it impinges on the exhaust end plate 242 which joins, in a leak proof manner, the exhaust end 196 of the outer tube 210 to the outer surface of the inner tube 202. It then flows through the inner air flow space 204 back to the inlet end 198 where the air, now further heated by radiant energy from the outer surface of inner tube 202, enters the air fed chamber 228 for further distribution through the holes 234 and into the burner 214.

The ratio of air flowing into and through the respective portions of the burner is defined by the respective areas of the holes 234 into those areas. As best shown in FIG. 3, the number of holes 234 and cross sectional area of each hole is chosen, in one preferred embodiment, so that holes 234 in the second air feed plate 236 and side wall of the inner fire tube 216 comprise 50% of the hole area, which feeds the first fire zone 250, and the holes in the air feed plate feeding the space between the inner fire tube 216 and the inlet end of the central tube 202 constitutes the remaining 50% distributed so that 25% of the open area is in the holes 234 in the air feed plate over the space between the inner fire tube 216 and the middle or central fire tube 218, feeding the second fire zone 252, 12.5% % of the open area is through the holes 234 into the space between the middle fire tube 218 and the outer fire tube 220, feeding the third fire zone 254, and the remaining 12.5% of the open area is through the holes 234 into the space between the outer fire tube 220 and the inner tube 202, feeding the fourth fire zone 256.

Accordingly, a defined amount of fuel is fed through the fuel nozzle 218 directly into the first fire zone 250. A stoichiometric amount of air, or a slight excess, at the desired combustion pressure, and having an elevated temperature heat generated as a result of compression and, if desired, countercurrent heat exchange with hot gases exiting the combustor, is fed into the closed space 230. The air flows through the outer air flow space 208 and the inner air flow space 204 where it picks up further heat radiated from the inner tube 202 once combustion is initiated. This now further heated air is distributed through the holes so that the fuel is burned with oxygen in 50% of the air feed which enters the first fire zone 250. As the oxygen starved flame enters the second fire zone 252 an additional amount of oxygen in the next 25% of the air is consumed; likewise, oxygen in the next 12.5% of the air is consumed by the flame in the third zone 254 and the oxygen in the remaining 12.5% of the air is consumed in the fourth fire zone 256, resulting in full, stoichiometric combustion entering the equilibration chamber 258.

The temperature of the flame and combustion chamber temperature profile is monitored through thermocouples, or other temperature sensors 260 located throughout the combustor. The locations of the temperature sensors 260 in FIG. 2 are merely representative and may be in various different locations in the center and on the walls of the tubes as required.

In order to control the temperature of the flame and the temperature profile in the combustion chamber liquid water (not steam) is injected through water nozzles 201 into the combustor at several locations. FIGS. 2 and 3 show several water nozzles 201 which are used to transfer the liquid water from the exterior of the combustor into the equilibration chamber 258 of the combustor. As best shown in FIG. 2, several sets of water nozzles 201 are placed along the length of the combustor. In a preferred embodiment at least three sets of nozzles 270, 272, 274 are used and each set includes three nozzles 201 with the three nozzles 201 being only in less than about 180° of the circumference and at least two of the sets being in a different 180° of the circumference to cause a mixing flow, and possibly a vortex flow, in the working fluid passing along the length of the equilibration chamber 258. While the nozzles are shown to be radial to the combustor inner tube 202, to create more turbulence as the water enters the equilibrium chamber, flashes to steam and expands, the nozzles maybe placed at any number of different angles to the central axis of the combustor to create more tangential flow or to direct the injected material down stream. The water control 40, in coordination with control valves (not shown) on each of the nozzles 201 or each set of nozzles 270, 272, 274 controls the amount and location of water introduced through the respective nozzles 201 into the equilibration chamber 258 and, in turn the temperature at specific spots in the chamber 258 and the temperature profile therein. Under normal operating conditions less than all of the nozzles 201 may be injecting water at any time. FIG. 2 also shows at least one water nozzle 201 for providing water to the air feed chamber 228 to add steam to the air prior to said air being reacted with the fuel. Further, additional nozzles may feed water into the inner or outer air flow space 204, 208. The ultimate objective, which has been demonstrated by actual operation of the combustor is to limit the temperature in the equilibration chamber 258 and the fire zones 250, 252, 254, 256 to not greater than about 2200° to 2600° F. thus preventing or significantly limiting the formation of $NO_x$ while providing sufficient residence time at above about 1800° F. to allow complete conversion of the burning fuel to $CO_2$. Additionally, more water nozzles may be added further down stream as desired to add additional water if, for example it is desired to feed a steam turbine rather than a gas turbine or the ultimate objective is to produce large quantities of high pressure, high temperature steam. In such instances, water to fuel ratios as high as 16 to 1 have been demonstrated without effecting the flame stability or generating pollutants.

While the fuel injected into the combustor will spontaneously ignite once the internal components of the combustor are hot, it is initially necessary, when starting a cold combustor, to provide a ignition spark to initiate the flame. This is provided by igniter 262 located in the first fire zone 250. FIG. 3 shows two igniters 262. However, it has been shown that a single igniter is adequate. The igniter 262 is typically a spark plug such as is used in high temperature aircraft engines. However, a glow plug, resistance heated high temperature metal rod or a spark ignited hydrogen flame are also suitable to institute ignition. One skilled in the art will readily identify alternative igniters.

The multiple tube construction of the combustor provides a unique benefit regarding the mechanical stress applied across the central tube 202 during operation. In the preferred embodiment discussed above, the working fluid in the space within the inner tube 202 (the equilibration chamber 258) is at elevated temperatures, possibly as high as 2600° F., and pressures from about 4 atmospheres to greater than 30 atmospheres. Generally, if a means were not provided to lower the temperature of the wall of inner tube 202 or prevent the inner tube 202 from experiencing a significant differential pressure across that wall, these operating conditions could damage the material used to construct the tube. However, as shown in FIG. 2, the air exiting the compressor 10 enters the outer air flow space 208 at a pressure substantially the same as the pressure within the inner tube 202. Substantially the same pressure exists within the inner air flow space 204. As a result, the central tube 202, with the exception of its exhaust end 196, for all practical purpose does not have a differential pressure applied thereto. Further, the compressed air flowing through the inner air space 204 continuously sweeps across the entire outer surface of the inner tube 202, thus keeping the inner tube outer diameter at a temperature less than that of the working fluid flowing in the equilibration chamber 258. The only tube exposed to the full differential pressure, ie, the pressure difference between the internal pressure in the combustor and atmospheric pressure, is the outer tube 210 which is at the lowest temperature of the three tubes and is most capable of withstanding the differential pressure. This design is so effective in keeping the outer tube 210 at the lowest possible temperature that if room temperature compressed air is fed to the combustor operating at a TIT of 2100° F. the outer tube 210 is cold to the touch during operation.

The pressure ratio, turbine inlet temperature, and water inlet temperature can be varied as required by the application in which the VAST cycle is used. Additionally, the fuel/air ratio is changed depending on the type of fuel used, to assure stoichiometric quantities, and the efficiency of systems using the combustor can be increased by use of more efficient compressor and turbine designs. Increasing the air feed while maintaining the fuel/air ratio constant results in a proportional increase in the power output.

The VAST cycle is a combination of a compressed air work cycle and a steam cycle since both air and steam are present as a working fluid. Each makes up a portion of the total pressure developed in the combustor. In the present discussion, it will be understood that the term working fluid is intended to include the steam generated from injected water, products of the fuel burned with the oxygen in the inlet compressed air together with the nonburnable air components and any excess compressed air which may be present, and thus includes all of the products of combustion, inert air components and steam. The term "steam" refers to water which is injected in the liquid state to become superheated steam. The described process makes use of the combined steam, combustion products and air as a working fluid.

A brief discussion of the thermodynamic processes in the VAST cycle now follows. The air is compressed in compressors, generally a two or three stage compressor, 10. The exit conditions at the outlet of compressor 10 are calculated using isentropic relations for compression and the real conditions are calculated using a compressor efficiency of 85%.

As explained above, compressed air enters combustion chamber 25 through air flow control 27.

The combustion chamber 25 burns fuel at constant pressure under conditions also approximating constant temperature burning. The temperature is completely controllable since there are independent fuel, air and water controls. Compressed air input to the combustor, after start-up, is at constant pressure. Thus, the combination of the air feed at a constant pressure and a fixed fuel/air ratio in combination with control of the TIT by water injection results in a constant pressure in the combustion chamber. Burning occurs in the combustor immediately following injection of fuel under high pressure and provides idealized burning conditions for efficiency and avoidance of air contaminants in which the fuel mixture may at first be richer than the mixture for complete combustion, additional air being added as burning continues, this air being added circumferentially around the burning fuel and in an amount which, as a minimum, equals the amounts necessary for complete combustion (a stoichiometric amount) but can ultimately exceed that necessary for complete combustion of the fuel components. While a stoichiometric amount of air may be introduced a 5% excess appears to force complete combustion and provides excess oxygen for acceleration if desired.

Water at high pressure, which may be as high as 4000 psi or greater, is injected by water injection control 40. The pressure is maintained at a level to prevent vaporization prior to entering the combustor. Due to the high temperatures and lesser pressure in the combustion chamber 25, the injected water is instantaneously flashed into steam and mixes with the combustion gases. The amount of water that is added into the combustion chamber 25 depends on the desired turbine inlet temperature (TIT) and the temperature of the water just prior to injection. Part of the heat released during the combustion of fuel is used to raise the temperature of the unburned (inert) portion of the compressed air from the three stage compressor 10 to the TIT. The remaining heat of combustion is used to convert the injected water into steam.

Table 1 sets forth several sets of operating conditions for a system using #2 diesel fuel. For example referring to Example 30, a pressure ratio of 30/1, a turbine inlet temperature of 2050° F., a turbine outlet pressure of 0.5 atmosphere and a water inlet temperature of 598° F. are indicated. The results predicted by a computer simulation modeling the system projects the efficiency of the compressor and the work engine using a fairly standard published turbine efficiency of 92%. This resulted in a net horsepower of 760, an SFC of 0.31 and an efficiency of 0.431. The examples calculated in Table I of a simulated process and listed in the data tables show the result of varying the pressure ratio, water inlet temperature and Turbine Inlet Temperature (TIT) held constant.

In a like manner, other operating conditions can be varied. For example the water temperature can be increased, the maximum temperature being not greater than the desired TIT. Preferentially, the water temperature is not increased to a temperature greater than about 50° F. below the desired TIT. However, for practical reasons, since the working fluid exiting the turbine is used to heat the feed water, the inlet water is usually held to no more than about 50° F. below the turbine exit temperature. The higher the water temperature the greater the quantity of water necessary to reduce the combustion temperature to the TIT, thus resulting in a greater mass of gases flowing to the turbine and a greater power output. Likewise the TIT can be raised or lowered. Examples 1–7 in the data table were calculated at a TIT equal to 1800° F. This is the generally accepted maximum for turbines which do not utilize high temperature alloys or hollow blade cooling with either air or steam. However, utilization of high temperature and/or corrosion resistant alloys, high temperature composites, ceramics and other materials designed for high temperature operation, such as used in turbine jet engines will allow operation at 2300° F. or higher. Examples 8–13, 15–31, and 14 illustrate operation at more elevated temperatures, namely 2000° F., 2050° F. and 2175° F. respectively.

Examples 1–5 of Table 1 show the effect on horsepower, efficiency and SFC by increasing the air compression ratio.

The effect of reducing the exit pressure (calculated at a turbine efficiency and compressor efficiency of 85%) is shown in Examples 2, 6 and 7. Examples 8–13 show the effect of air compression ratio on a system with a TIT of 2000° F., a turbine exit pressure of 0.5 atmosphere and a $H_2O$ inlet temperature of about 595 to about 700° F. when calculated at an assumed turbine efficiency of 90%. It should be noted that a turbine efficiency of 93% is claimed by currently available air compression axial turbines and the power turbine expander train.

Examples 15–24 and 25–31 further demonstrate the effect of increasing air pressure at two different turbine efficiencies.

In Examples 1 through 31, the fuel is diesel #2 and the fuel to air ratio is 0.066, which is the stoichiometric ratio for #2 diesel fuel. With other fuels a different f/a ratio is required to maintain stoichiometric conditions. Example 32 uses methane and a f/a=0.058. Because methane burns more efficiently than diesel fuel, less fuel per pound of air is used and, as a result, less water is added.

TABLE 1

VAST CYCLE
F/A = 0.660

| Ex. | Air Comp. Ratio | Turb. Eff. % | $H_2O$ Temp ° F. | TIT ° F. | Turb. Exit Press, atmos | Turb HP | Open Cycle HP | Eff | SFC | Closed Cycle HP | Eff. | SFC |
|---|---|---|---|---|---|---|---|---|---|---|---|---|
| 1 | 10:1 | 85 | 502 | 1800 | 1.0 | 722 | 517 | .292 | .459 | 517 | .292 | .459 |
| 2 | 22:1 | 85 | 566 | 1800 | 1.0 | 891 | 582 | .328 | .408 | 534 | .301 | .445 |
| 3 | 30:1 | 85 | 631 | 1800 | 1.0 | 947 | 590 | .333 | .403 | 542 | .305 | .439 |
| 4 | 40:1 | 85 | 594 | 1800 | 1.0 | 998 | 592 | .334 | .401 | 544 | .307 | .436 |
| 5 | 50:1 | 85 | 564 | 1800 | 1.0 | 1036 | 591 | .333 | .402 | 543 | .306 | .438 |
| 6 | 22:1 | 85 | 595 | 1800 | 0.5 | 978 | 669 | .377 | .377 | 549 | .309 | .433 |
| 7 | 22:1 | 85 | 512 | 1800 | 0.25 | 1047 | 738 | .416 | .322 | 520 | .293 | .457 |
| 8 | 5:1 | 90 | 702 | 2000 | 0.5 | 770 | 649 | .366 | .366 | 515 | .290 | .461 |
| 9 | 10:1 | 90 | 702 | 2000 | 0.5 | 966 | 775 | .437 | .307 | 661 | .372 | .360 |
| 10 | 15:1 | 90 | 681 | 2000 | 0.5 | 1041 | 803 | .452 | .296 | 691 | .389 | .344 |
| 11 | 20:1 | 90 | 650 | 2000 | 0.5 | 1091 | 816 | .460 | .291 | 706 | .398 | .337 |
| 12 | 25:1 | 90 | 621 | 2000 | 0.5 | 1128 | 822 | .463 | .289 | 712 | .402 | .334 |
| 13 | 30:1 | 90 | 595 | 2000 | 0.5 | 1158 | 826 | .465 | .288 | 716 | .403 | .332 |
| 14 | 29:1 | 90 | 663 | 2175 | 0.5 | 1242 | 914 | .515 | .260 | 805 | .454 | .295 |
| 15 | 5:1 | 85 | 700 | 2050 | 0.5 | 730 | 601 | .339 | .395 | 439 | .248 | .541 |
| 16 | 10:1 | 85 | 700 | 2050 | 0.5 | 918 | 715 | .403 | .333 | 587 | .331 | .404 |
| 17 | 15:1 | 85 | 700 | 2050 | 0.5 | 1026 | 771 | .434 | .308 | 663 | .373 | .359 |
| 18 | 20:1 | 85 | 685 | 2050 | 0.5 | 1081 | 786 | .443 | .302 | 665 | .375 | .357 |
| 19 | 25:1 | 85 | 670 | 2050 | 0.5 | 1123 | 795 | .448 | .299 | 674 | .380 | .353 |
| 20 | 30:1 | 85 | 651 | 2050 | 0.5 | 1154 | 797 | .449 | .291 | 675 | .381 | .352 |
| 21 | 35:1 | 85 | 633 | 2050 | 0.5 | 1180 | 797 | .449 | .298 | 676 | .381 | .352 |
| 22 | 40:1 | 85 | 617 | 2050 | 0.5 | 1202 | 797 | .449 | .298 | 676 | .381 | .352 |
| 23 | 45:1 | 85 | 602 | 2050 | 0.5 | 1222 | 796 | .448 | .299 | 675 | .380 | .352 |
| 24 | 50:1 | 85 | 588 | 2050 | 0.5 | 1239 | 794 | .447 | .299 | 672 | .379 | .353 |
| 25 | 5:1 | 92 | 700 | 2050 | 0.5 | 785 | 667 | .376 | .356 | 529 | .298 | .449 |
| 26 | 10:1 | 92 | 700 | 2050 | 0.5 | 984 | 798 | .450 | .298 | 695 | .392 | .342 |
| 27 | 15:1 | 92 | 685 | 2050 | 0.5 | 1078 | 845 | .476 | .281 | 737 | .416 | .322 |
| 28 | 20:1 | 92 | 655 | 2050 | 0.5 | 1128 | 860 | .484 | .276 | 753 | .424 | .316 |
| 29 | 25:1 | 92 | 625 | 2050 | 0.5 | 1166 | 868 | .489 | .274 | 762 | .430 | .312 |
| 30 | 30:1 | 92 | 598 | 2050 | 0.5 | 1195 | 872 | .491 | .273 | 760 | .431 | .310 |
| 31 | 35:1 | 92 | 574 | 2050 | 0.5 | 1221 | 874 | .493 | .272 | 769 | .433 | .309 |
| 32 | 29:1 | 93 | 664 | 2175 | 0.5 | | | | | 840 | .475 | .250 |

TABLE 2

BRAYTON CYCLE
F/A = 0.02020
1# Air/Sec

| Ex. | Air Comp. Ratio | Turb. Eff. % | $H_2O$ Temp ° F. | TIT ° F. | Turb. Exit Press, atmos | Turb HP | Closed Cycle HP | Eff | SFC |
|---|---|---|---|---|---|---|---|---|---|
| 33 | 5:1 | 92 | | 2050 | 1.0 | 313 | 200 | .369 | .363 |
| 34 | 10:1 | 92 | | 2050 | 1.0 | 414 | 234 | .431 | .311 |
| 35 | 15:1 | 92 | | 2050 | 1.0 | 466 | 239 | .440 | .304 |
| 36 | 20:1 | 92 | | 2050 | 1.0 | 499. | 237 | .436 | .307 |
| 37 | 25:1 | 92 | | 2050 | 1.0 | 523 | 231 | .425 | .315 |
| 38 | 30:1 | 92 | | 2050 | 1.0 | 542 | 224 | .413 | .325 |
| 39 | 35:1 | 92 | | 2050 | 1.0 | 557 | 216 | .398 | .336 |
| 40 | 40:1 | 92 | | 2050 | 1.0 | 570 | 208 | .384 | .349 |

Example 32 is also calculated at a turbine efficiency of 93%, and a turbine inlet temperature of 2175° F. which are both claimed as operating parameters of commercially available turbines (which do not use the claimed invention.)

Figure 6:
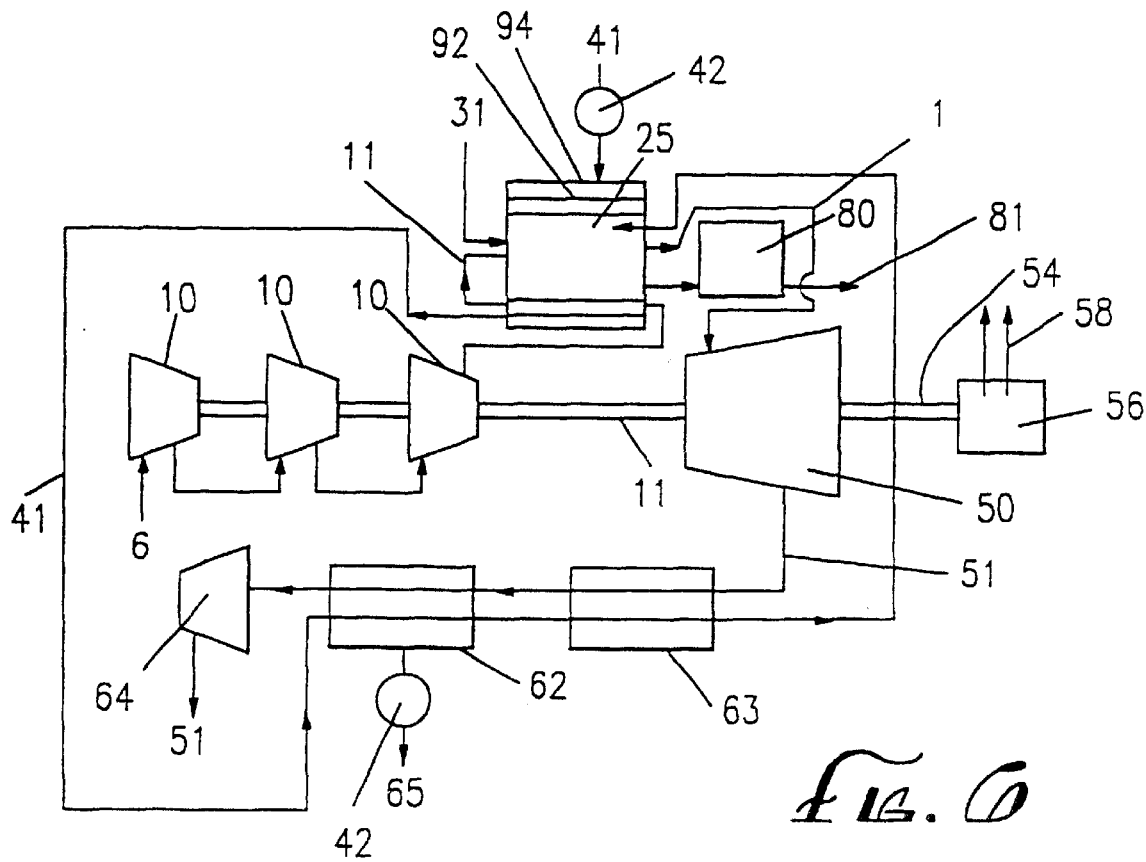
FIG. 6 is a schematic drawing of a second embodiment of a vapor-air steam turbine engine with potable water recovery capabilities incorporating features of the invention.
Figure 7:
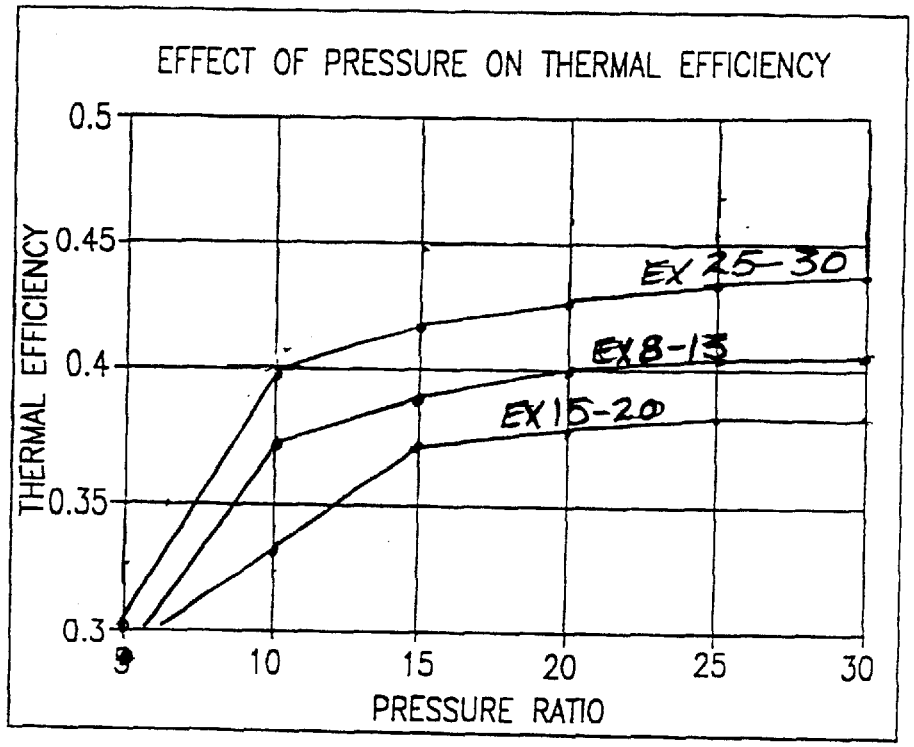
FIG. 7 is a graph showing the effect of pressure ratio on thermal efficiency for the vapor-air steam turbine engine of FIG. 1.
Figure 8:
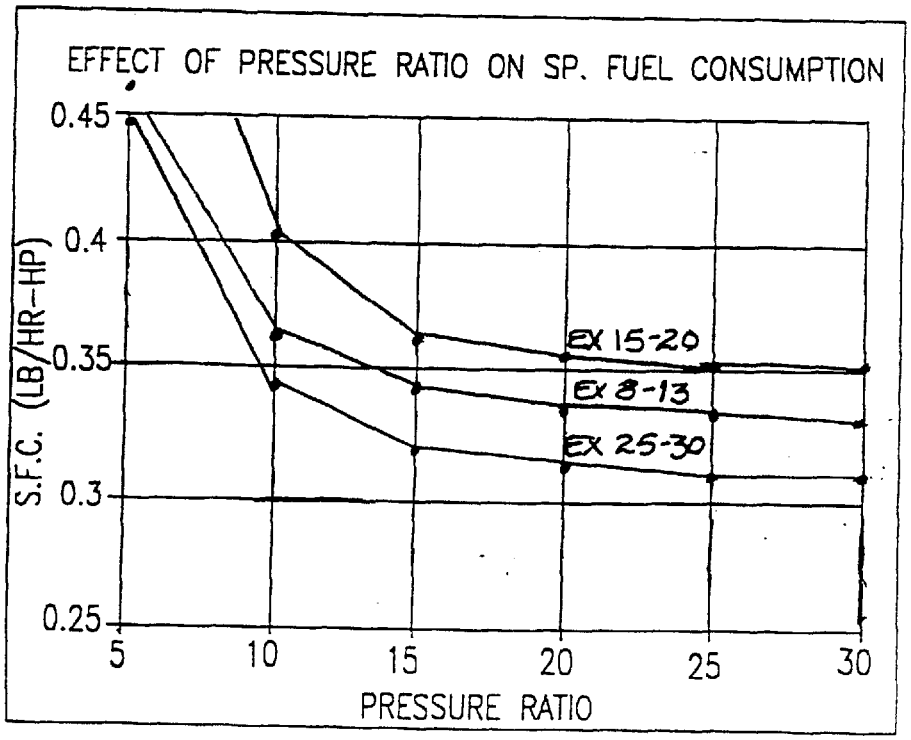
FIG. 8 is a graph showing the effect of pressure ratio on specific fuel consumption for the vapor-air steam turbine engine of FIG. 1.
Figure 9:
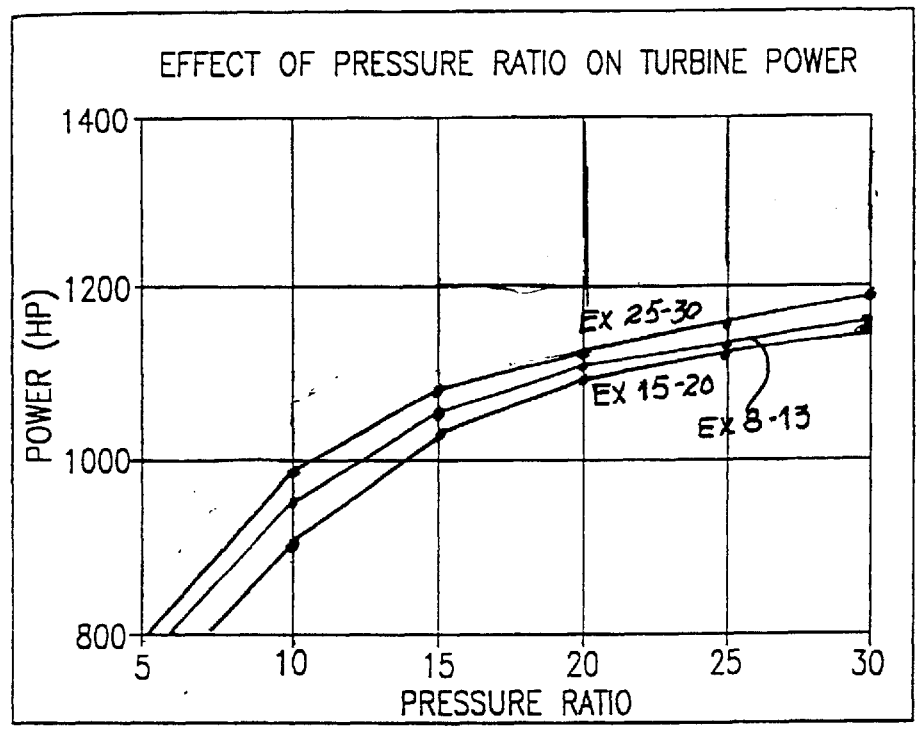
FIG. 9 is a graph showing the effect of pressure ratio on turbine power for the vapor-air steam turbine engine of FIG. 1.
Figure 10:
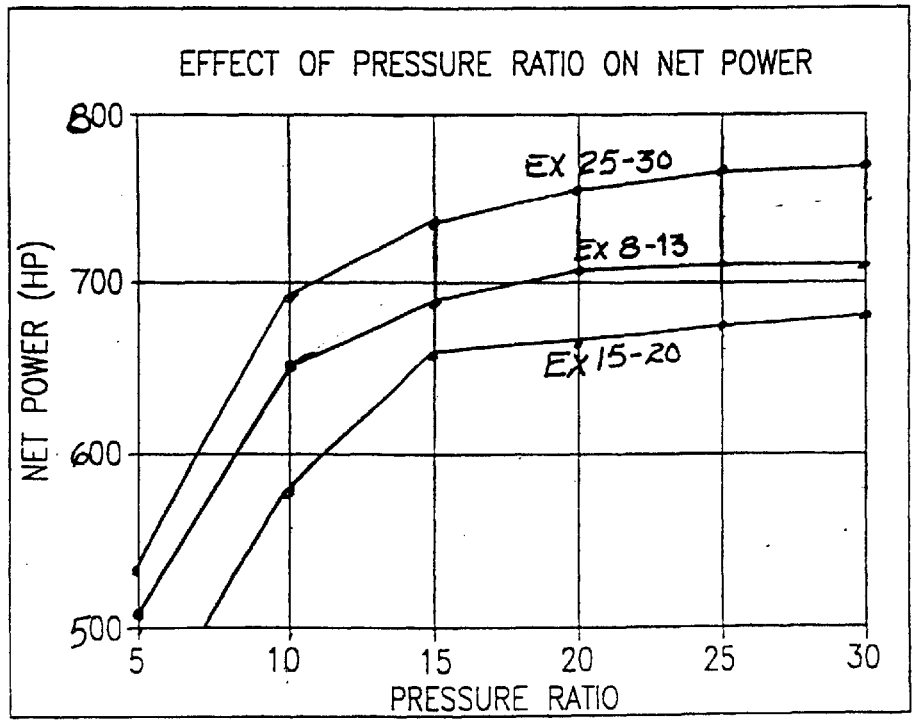
FIG. 10 is a graph showing the effect of pressure ratio on net power for the vapor-air steam turbine engine of FIG. 1.

The effect of changing air compression ratio on the closed cycle performance of the systems listed in examples 8–13, 15–20 and 25–30 are plotted on FIGS. 7–10. In particular FIG. 6 shows thermal efficiency, FIG. 7 shows SFC, FIG. 8 shows turbine power and FIG. 9 shows net power.

The combustor of the invention differs from prior devices in a fundamental respect since the working fluid mass may be increased either at constant pressure, constant temperature or both. Constant temperature is maintained by combustion controller 100 through controlled water injection by water injection control 40 in response to temperature monitors (thermostats) in combustor 25. Within combustor 25, typical combustion temperatures for liquid hydrocarbon fuels reach about 3,000° to 3,800° F. when a stoichiometric amount or a small excess of compressed air is supplied by compressor 10. Larger quantities of excess air reduce the resulting turbine inlet temperature but would not greatly affect the actual temperature of burning or the ignition temperature.

The practical limit of the discharge temperature from the combustor 25 is in turn governed by the material strength of the containing walls at the discharge temperature, the high temperature tolerance of the combustor walls, the materials of construction of the power turbine, and whether the turbine blades are separately cooled, either externally or internally. This discharge temperature is controlled between suitable limits by variation in the injection of high pressure water which then flashes to steam, the heat of the vaporization and superheat being equated to the heat of combustion of the fuel being burned. (The temperature of the burning fuel is reduced to the desired TIT primarily if not totally by the heat of vaporization and superheat as the water vaporizes and then heats up to the TIT). The quantity of injected water is thus determined by the desired operating temperature, being less for high superheats, but actually maintaining a fixed operating temperature.

The working pressure is kept constant by compressor 10 as required by any desired engine rpm.

The resulting working fluid mixture of combustion gases unreacted components of air (i.e. $N_2$, $CO_2$) and steam is then passed into a working engine 50 (typically a turbine as explained above) where expansion of the steam—gas mixture takes place. The exit conditions at the outlet of working engine 50 are calculated using isentropic relations and turbine efficiency.

The exhaust gases and steam from work engine 50 are then passed through an exhaust control 60. Exhaust control 60 includes a condenser where the temperature is reduced to the saturation temperature corresponding to the partial pressure of steam in the exhaust. The steam in the turbine exhaust is thus condensed and may be pumped back into the combustion chamber 25 by water injection control 40. The remaining combustion gases are then passed through a secondary compressor where the pressure is raised back to the atmospheric pressure if a vacuum was pulled on the exit of the turbine so that it can be exhausted into the atmosphere. Alternatively, the exhaust from the turbine, which is a superheated steam stream, can be used directly, as will be recognized by those skilled in the art.

It can be seen that the present invention takes substantial advantage of the latent heat of vaporization of water. When water is injected into a combustion chamber, and steam is created, several useful results occur: (1) the steam assumes its own partial pressure; (2) the total pressure in the combustor will be the pressure of the combustion chamber as maintained by the air compressor; (3) the steam pressure is without mechanical cost, except a small amount to pump in the water at pressure; (4) the steam pressure at high levels is obtained without mechanical compression, except the water, with steam at constant entropy and enthalpy. The water conversion to steam also cools the combustion gases, resulting in the pollution control described below.

B. Pollution and Efficiency Control

Any type of combustion tends to produce products which react in air to form smog, whether in engines or industrial furnaces, although of different kinds. The present invention reduces or eliminates the formation of pollution products in several ways discussed below.

First, internal combustion engines operated with cooled cylinder walls and heads have boundary layer cooling of fuel-air mixtures sufficient to result in small percentages of unburned hydrocarbons emitted during the exhaust stroke. The present invention avoids combustion chamber wall cooling in two distinct ways to keep the burning temperature for the fuel at a suitable level, both of which are shown in more detail in U.S. Pat. No. 3,651,641. First, hot compressed air is made to flow by air flow control 27 around an exterior wall of combustor 25 such that combustion occurs only within a small space heated above ignition temperatures. Second, the combustion flame is shielded with air unmixed with fuel. Thus, a hot wall combustion, preferably above 2000° F., is utilized in an engine operating on the present cycle.

Next, smog products are also inhibited by operating the combustor 25 within a defined temperature range. For example, CO and other products of partial combustion are reduced by high temperature burning, preferably well above 2000° F., and by retaining such products for a considerable dwell time after start of burning. At too high a temperature, however, more nitrous and nitric oxides ($NO_x$) are formed. Accordingly, neither extremely high nor extremely low temperatures are acceptable for reducing smog products. The combustion controller 100 in the present invention commences burning of the fuel and air at a controlled low temperature by the staged burning in the burner 214, then increasing progressively for a considerable dwell time and then cools (after completion of the burning) to a predefined, smog-inhibiting temperature (TIT) by the use of water injection. Thus, combustion is first performed in a rich mixture; then sufficient compressed air is added to allow complete combustion of the fuel with a minimum of excess oxygen and to cool the gases below about 2500° F. for about half of the dwell time in the combustion chamber 25. Water injection is directly added to the burner, combustion chamber or upstream by water injection control 40 to maintain an acceptable temperature preferably in the range of about 2500° F. that assures complete burning of all the hydrocarbons before cooling to the desired TIT.

In typical engines, hydrocarbon fuels are often burned in a mixture with air a little richer in fuel, i.e., at less than stoichiometric proportions in order to increase efficiency. This, however, results in excess CO and more complex products of incomplete combustion. The present invention, however, because it provides a progressive supply of air through air flow control 27, dilutes the combustion and further reduces such smog products.

Oxides of nitrogen also form more rapidly at higher temperatures as explained above, but can also be reduced by the controlled dilution of the combustion products with additional compressed air.

The present combustion cycle is compatible with complete and efficient fuel burning and eliminates incomplete combustion products and reduces other combustion products such as nitrogen oxides. Combustion controller 100 allows burning of the combustion products at a considerable initial dwell time, after which the products of combustion and excess air are then cooled to an acceptable engine working temperature, which may be in the range of 1000° F. to 1800° F., or even as high as 2300° F. if proper materials of construction are used in the turbine, or may be as low as 700° F. to 800° F.

An equilibrium condition can be created by making combustion chamber 25 at least about two to four times the length of the burning zone within combustion chamber 25; however, any properly designed combustion chamber may be used.

A burning as described provides a method of reducing smog-forming elements while at the same time, providing a complete conversion of fuel energy to fluid energy.

The VAST cycle is a low pollution combustion system because the fuel-air ratio and flame temperature are controlled independently. The control of fuel-air ratio, particularly the opportunity to burn all of the oxygen in the compressed air (or to dilute with large amounts of compressed air, if desired) inhibits the occurrence of unburned hydrocarbon and carbon monoxide resulting from incomplete combustion. The use of an inert diluent (water) rather than air permits control of the formation of oxides of nitrogen and represses the formation of carbon monoxide formed by the dissociation of carbon dioxide at high temperature. The use of diluents of high specific heat, such as water or steam, as explained above, reduces the quantity of diluent required for temperature control. In the case of oxides of nitrogen, it should be noted that the VAST cycle inhibits their formation rather than, as is true in some systems, allowing them to form and then attempting the difficult task of removing them. The net result of all of these factors is that the VAST cycle operates under a wide range of conditions with negligible pollution levels, often below the limits of detection for hydrocarbons and oxides of nitrogen using mass spectroscopic techniques.

Others have attempted to inject small amounts of water but they have done so under conditions not conducive to, or incompatible with, operation at zero pollution resulting in reducing efficiency.

Kidd U.S. Pat. No. 4,733,527 refers to the injection of relatively small amounts of water into the combustion chamber at the same time as the fuel and apparently into the flame itself, thus reducing the is temperature of the flame in an attempt to reduce $NO_x$ formation. However, Kidd, as well as other persons skilled in the art, have been unable to obtain significant reduction of, or prevent the formation of, $NO_x$. The best $NO_x$ levels that have been demonstrated by others on a combustor, without catalytic converters, is about 25 to 30 ppm. Kidd demonstrates the best known prior art with control and reduction of $NO_x$ levels to no less than 30 ppm by adding water in amounts equal to or less than the amount of fuel, ie WFR=1.0.

In contrast thereto applicant has actually demonstrated $NO_x$ levels as low as 4 ppm with a WFR of 5.57 when the compressed air inlet temperature was approximately 400° F. This is more fully set forth below. If the air temperature had been 964° F., which is the standard exhaust temperature from a 2 stage compressor at 30:1, the WFR would have been 8.27. The ability to deliver such large amounts of water is a result of operating a unique combustor, at conditions which everyone in the past has said are inoperable and at which those skilled in the art have said that unacceptable low temperatures would be created, combustion flame would be extinguished, and the operating efficiency would render the equipment unusable as a power source for a work engine. Contrary to the prior art which operated to lower the flame temperature on a system already using large amounts of air to control temperatures, applicant generates a controlled hot flame with a stoichiometric amount of air and then rapidly cools the combustion products to produce the desired exhaust composition.

Substantially all of the cooling of the working fluid and/or the combustion temperature and the exit temperature (the exit from the combustor or turbine inlet temperature) is provided by the latent heat of vaporization of the injected liquid, such as liquid water. The result is that the fuel/air mixture can be selected so that the most efficient flame from the standpoint of combustion, combustion products and heat generation can be selected and operation is not constrained by the need, as in prior art devices, to provide considerable excess air for cooling the combustion products. Further, prior art devices, controlled pollutants by limiting the flame temperature. In contrast thereto the present invention allows a stoichiometric mixture (or near stoichiometric) of air and fuel to be used to produce a hot staged flame with complete combustion to eliminate CO residuals, followed by controlled cooling and mixing of the combustion products to the desired TIT, the combination preventing the formation of $NO_x$.

Further, one skilled in the art knows that the amount of power produced by a power turbine depends on the temperature and the mass of the working fluid entering the turbine and the pressure difference across the turbine. When a hot, efficient flame is produced by providing a stoichiometric mixture of fuel and air (generally above 2300° F.) and substantially all cooling is provided by the latent heat of vaporization of liquid water injected into the combustion chamber, the injected liquid being used to reduce the exit temperature of the working fluid, to the maximum TIT for a state of the art gas turbines (1850° F. to about 2100° F.) the amount of water is from about 5 to about 8 times the weight of fuel used, depending on the flame temperature and the temperature of the compressed air and water entering the combustor. For a specific flame, water, and air inlet temperature, the quantity of water supplied can be precisely determined for a desired TIT. While the gas turbine will operate in a highly efficient manner when the TIT of the working fluid in the 1850–2100° range, efficiency can be improved by using a higher TIT. The current limiting factor is the materials of construction of state of art turbines. Increasing the mass of the working fluid entering the turbine while lowering its temperature by injecting high volumes of water to produce the preferred TIT significantly increases the efficiency of electrical energy production by the turbine. This is accomplished by use of applicant's invention wherein the excess air is substantially eliminated resulting in a hot flame. Rapid cooling to the preferred TIT by water injection results in improved efficiency for the production of useful energy while at the same time preventing the formation of undesirable pollutants such as NO and $NO_2$ due to the almost complete elimination of excess $O_2$ available for nitrogen oxidation.

Table 1 of the specification lists selected operating conditions and results generated for 32 different operating conditions. In all instances the efficiency is higher than, and the specific fuel consumption is less than, prior art engines, operating with the same amount of fuel. Table 2, Examples 33–40 show simulation results of Brayton cycle engines operating with the same amount of air at an A/F=0.02020. Computer simulation has shown that the claimed engine will operate 10% more efficiently, and the fuel consumption will be 10% less than engines operating without the claimed invention.

Actual operation of a combustor under conditions produced a working fluid with $NO_x$ and CO below 1 ppm and no unburned fuel (HC). 99–100% combustion efficiency was obtained. The combustor operated in a stable manner (no evidence of flame instability or temperature fluctuation) with water/fuel ratios used for the examples set forth in Table 3.

Table 3 sets forth data obtained for a VAST Combustor fabricated and operated in the manner described herein using diesel #2 as the fuel and under conditions set forth in Example 3, 13, 20 and 30, with the exception that the exit pressure was 1.0 atmosphere.

atmosphere exit pressure, at least an additional two pounds of water per pound of fuel is required to maintain the flame temperature in the desired range.

The exhaust gases exiting the combustor, when operated under the conditions listed in Table 3 hereto with indication of 0 ppm of CO, when visibly observed, were completely clear and transparent with no observable smoke, steam or particulate material. Aside from visual distortion due to the heat of the exhaust stream, there was absolutely no visible indication that diesel #2 fuel was being burned.

The combustor 25 represents a mechanism for using heat and water to create a high temperature working fluid without the inefficiencies that result when, in order to generate steam the heat is transmitted through a heat exchanger to a flash vaporizer or a boiler. The addition of water rather than merely heated gas to the products of combustion represents

TABLE 3

| PRESS RATIO/HP | 30:1/770 | 30:1/770 | 30:1/770 | 30:1/770 | 30:1/770 | 30:1/770 | 30:1/770 | 30:1/770 |
|---|---|---|---|---|---|---|---|---|
| AIR | 1.2314 | 1.16 | 1.0586 | 1.1501 | 1.0918 | 1.0833 | 1.2159 | 1.1493 |
| FUEL | 0.0658 | 0.0655 | 0.0649 | 0.064 | 0.0661 | 0.066 | 0.066 | 0.0646 |
| A/F | 18.71 | 17.71 | 16.31 | 17.97 | 16.52 | 16.41 | 18.42 | 17.79 |
| H2O | 0.4218 | 0.409 | 0.3851 | 0.3233 | 0.4361 | 0.3481 | 0.3679 | 0.3655 |
| # H2O/# FUEL | 6.41 | 6.26 | 5.93 | 5.05 | 6.60 | 5.27 | 5.57 | 5.66 |
| TIT | 1891 | 1937 | 1953 | 2103 | 1979 | 2032 | 1895 | 1781 |
| EFFICIENCY-% | 94.7 | 94.9 | 95.1 | 94.7 | 94.7 | 95.1 | 95.1 | 96.4 |
| O2-% | 4.3 | 3.9 | 3.6 | 2.4 | 2.4 | 3.3 | 3.6 | 3.6 |
| NOX-PPM | 23 | 8 | 8 | 7 | 5 | 7 | 4 | 6 |
| CO-PPM | 758 | 0 | 0 | 0 | 0 | 0 | 0 | 0 |
| CO2-% | 11 | 11.2 | 11.5 | 12.2 | 12.2 | 11.6 | 11.5 | 12.7 |
| EX AIR-% | 23 | 21 | 19 | 12 | 13 | 18 | 19 | 68 |
| COMBUSTIBLES-% | 0.04 | 0.03 | 0.00 | 0.05 | 0.04 | 0.00 | 0.00 | 0.05 |

The exhaust gas was analyzed using an Enerac 2000, provided by Energy Efficient Systems, calibrated for $O_2$, $NO_x$, CO and combustibles (unburned fuel) by the supplier. The Enerac 2000 was then connected by copper tubing to a test port located at the TIT position in the combustor.

Listed in Table 3 are various operating parameters and gas composition readings. The values given for fuel, air and water are in pounds per second. TIT corresponds to the turbine inlet temperature. Also included are calculations of the air/fuel ratio and water/fuel ratio.

The 7 lines on the bottom half of Table 3 reflect values measured by the Enerac 2000 ($NO_x$, CO, $O_2$, combustibles) and calculated values for burning efficiency, $CO_2$ and excess air. The manufacturer of the Enerac 2000 has indicated that the burning efficiency is artificial low because the particular unit used is an older unit which does not have a correction in the algorithm for measurement at ambient temperature rather than recommended temperature of 200° F. The actual values of burning efficiency rather than being from 94.4 to 96.4 are closer to 100%. The manufacturer of the test equipment has indicated that the measured values are much more reliable and that the readings of unburned fuels indicate 99–100% combustion efficiency.

Depending on operating conditions in each test run, $NO_x$ was below 9 ppm and CO was undetectable with recorded $NO_x$ levels as low as 4 ppm and observed readings on the digital readout of the test unit for other data points as low as 3 ppm.

While the water/fuel ratio for the illustrated test run was from 4.75 to 6.88, water to fuel ratios as high as 9.36 were recorded without effecting the stable operation of the combustor. Further, input air was approximately 400–500° F. When the input temperature is greater than 900° F., which is the typical temperature for a two stage compressor with a 30 a means for using a fluid source for producing the gas, the water flashing to steam providing a very efficient source of mass and pressure and at the same time giving tremendous flexibility in terms of temperature, volume, and the other factors which can be controlled independently. In addition, injected water, when added directly into the combustion chamber to quench the combustion process, greatly reduces contamination that results from most combustion processes.

Further, the amount of nitrogen available to form $No_x$ is significantly reduced. Only about 30% as much nitrogen is in the combusted gases of the combustion chamber 25 compared to a normal air dilution open cycle Brayton engine of any form or model because water rather than excess air is used for cooling and the amount of air fed to the system is thus greatly reduced. In particular, about ⅓ as much air is fed to the combustor. As discussed below this also significantly reduces the energy expended on compressing the feed air.

Further, the injected water rapidly expands as it flashes to steam, the volume increase at 30 atmosphere being greater than 50/1.

C. Water Injection

Water injection control 40 controls the pressure and volume of water 41 injected through nozzles 201, arranged for spraying a fine mist of water in the chamber. Water may be injected into the combustor in one or more areas, including: atomized into intake air before compressor 10, sprayed into the compressed air stream generated by compressor 10, atomized around or within the fuel nozzle or a multiplicity of fuel nozzles, atomized into the combustion flame in combustion chamber 25, or into the combustion gases at any desired location, or downstream into the combustion gases prior to their passage into work engine 50. Other areas of injection can be readily envisioned by the skilled artisan. As described earlier, the amount of water injected is based on the temperature of the combustion products and the desired maximum temperature and temperature profile in the equilibration zone 258 as monitored by temperature sensors 260 in combustor 25. The amount of water injected is also dependent on the system using the VAST cycle. For example, if the water is recycled as for use in a motor vehicle, the water is cooled as much as possible to obtain a usable balance between total water used and power output, i.e., if the inlet water temperature is low and the TIT is high a small volume of water can be used to reduce the combustion temperature to the TIT. On the other hand, if a major purpose of the system is to produce potable water from polluted or salt water, as discussed below, while generating electrical energy, the water inlet temperature would be raised as high as possible while the TIT is lowered.

D. Increased Available Power

Using the VAST system with water injection, a stoichiometric amount of air, or a slight excess of air, is fed. The amount of air fed is significantly reduced, when compared with a system burning the same quantity of fuel operating according to the Brayton cycle (no water injection, cooling provided by excess air). The VAST system thus requires a much smaller compressor then in a Brayton cycle combustor and, accordingly, that portion of the energy generated by the turbine which is used to drive the compressor is significantly reduced. For example, if about one-third of the Brayton cycle quantity of the air is used a smaller compressor with about one-third the power requirements can be used. The energy which would have gone to power the larger compressor is instead now available as additional energy for supplying the customer or run additional equipment.

Examples 33–40 list calculated values for a power system operating under the Brayton cycle. This data can be compared with Examples 25–31 operating (at 1#/sec air) under the same conditions according to the VAST system. Off particular relevance is the significant difference in the available turbine horsepower, a significant additional amount being available from a system operating with the VAST combustor.

More specifically, using the fuel requirements from the NACA tables for diesel #2, the Brayton cycle requires 0.0202 lbs/sec of diesel #2 for each pound of air. However, stoichiometric requirement (no excess air, all fuel and oxygen consumed) are 0.066 pounds of diesel per pound of air. In other words, when 0.0202 lbs of diesel are burned the oxygen in only 0.306 pounds of air are consumed. For equal quantities of fuel, namely 0.066 lbs of diesel, VAST consumes 1 pound of air while a Brayton cycle system utilizes 3.27 pounds of air. However, the VAST combustor requires 0.5463 pounds of water when operating at a TIT 2050° F. for a total mass flow to the turbine of 1.6123 pounds compared to 3.336 pounds for the Brayton cycle. Since the power output of the turbine depends on the mass fed to the turbine, In order for the turbine to generate the same amount of energy, the VAST combustor requires the total mass to be approximately doubled (2.07 times) increasing all of the feed components proportionally and the amount of air to 2.07 pounds. Comparing this to the 3.27 pounds required with Brayton, 1.2 pounds less air is required, a compressor of 63.3% of the size of the Brayton cycle is used and the energy needed to drive the compressor to supply the required air is reduced by 36.7%. Diesel #2 releases 1936 BTU/pound when fully combusted. It can then be calculated that 0.066 pounds of Diesel #2 when combusted generates 1808 combusted horsepower. Example 30, operating at 43.1% efficiency generates 766 hp. While Brayton operates at a lesser efficiency, assuming it operates at the same efficiency, the balance of the combusted horsepower is required to drive the compressor. Therefore, the compressor to deliver 3.27 pounds of air require 1042 hp or 318.65 hp per pound of air. Therefore, for the same amount of fuel, it can be calculated that about additional 723 hp is available as additional available shaft energy.

Another way of comparing the systems, if a current single shaft compressor turbine were operated and the VAST combustor were used to replace the combustor operating under the Brayton cycle sufficient mass is generated to drive the turbine in the same manner as in the past. However, because additional fuel must be burned to consume all the delivered oxygen and additional water added to control the temperature of that additional burned fuel sufficient excess mass is generated at the desired TIT to drive a second turbine at least about 50% in size of the first turbine, or a significant amount of additional higher temperature, high pressure steam is available for other power applications.

D. Other Embodiments of Present Invention

1. Power Plant Including Water Purification

Figure 4:
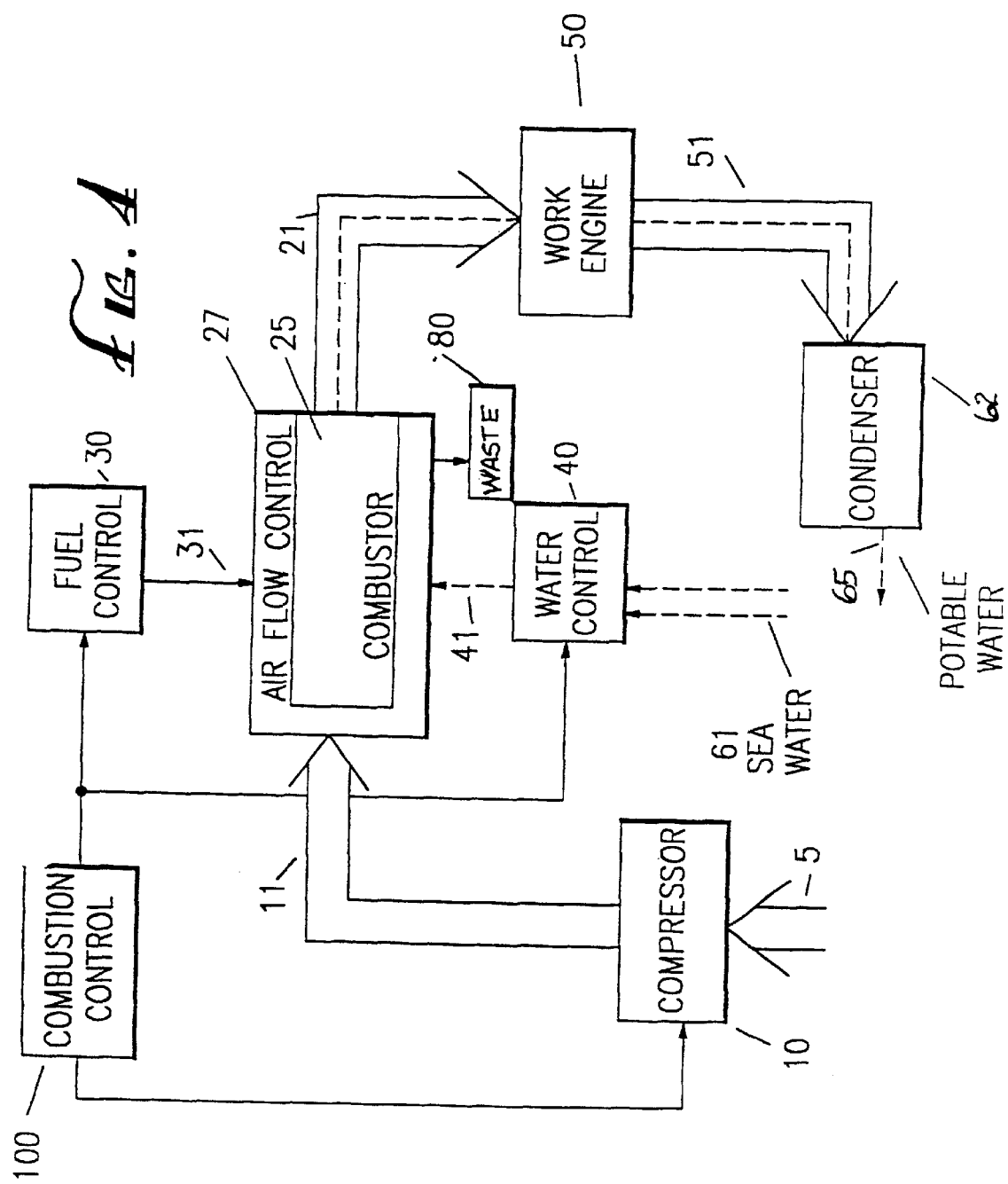
FIG. 4 is a block diagram of a vapor-air steam turbine engine that includes means for recovering potable water in accordance with the present invention.
Figure 5:
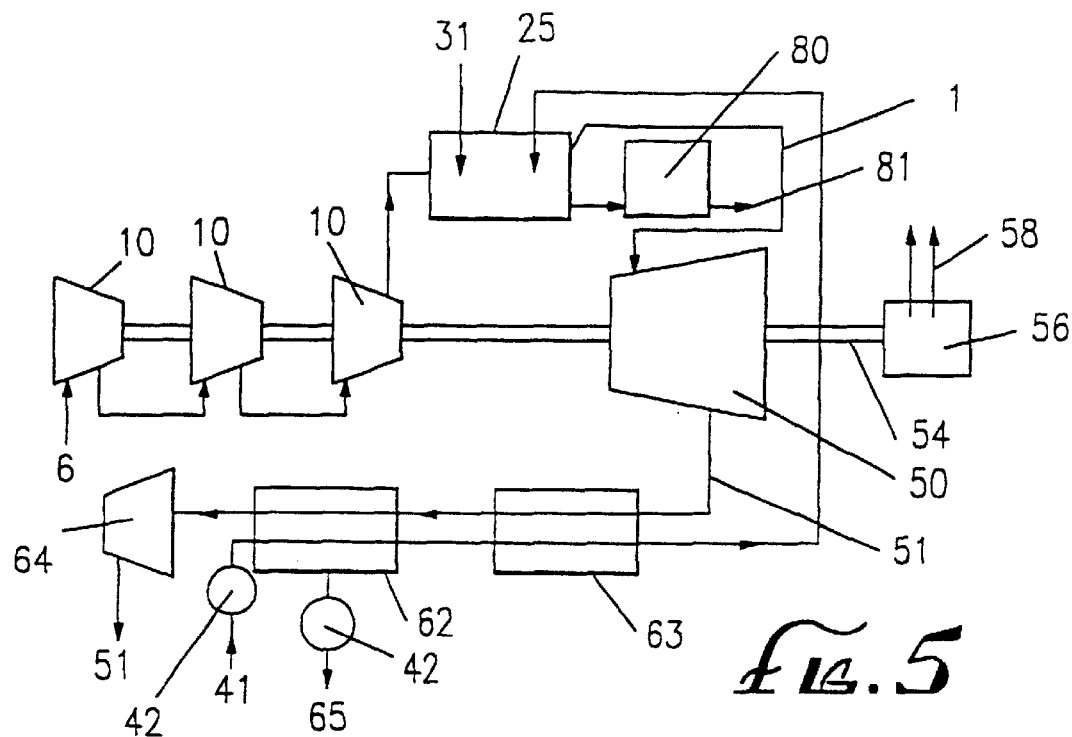
FIG. 5 is a schematic drawing of one embodiment of the vapor-air steam turbine engine shown by a block diagram in FIG. 4.

In the case of electric power generation using sea water, brackish water, or polluted ground water or well water as a coolant, the cycle may be open as to electric power, and the water used as shown in FIGS. 4 and 5. Feed water 41, moved by pump 42, is heated as it passes through condenser 62 and heat exchanger 63 countercurrent to exiting hot working fluid 51 and is flash vaporized in the combustor 25 or 200 as described above. By increasing the diameter of the combustion chamber the velocity of the working fluid can also be reduced thus allowing easier removal of water bourn materials or solutes.

The typical temperature of operation of the combustor is 1500° F. to 2300° F. When salt water or brackish water is the feed source this temperature is above the melting point but significantly below the boiling point of the salts in sea water (85% of sea salt is NaCl; an additional 14% is composed of $MgCl_2$, $MgSO_4$, $CaCl_2$ and KCl). When the water flashes to steam the dissolved inorganic contaminants rain out as a liquid and organic contaminants are combusted. For example, NaCl melts at 1473° F. and boils at 2575° F., the other salts have lower melting points and higher boiling points. As a result the molten salts are readily collected along the bottom wall of the combustor and the liquid salts can be removed by a screw assembly on the bottom of the combustor, fed through an extruder and die where it can be formed into rods or pellets, or sprayed through nozzles, using the pressure in the combustor as the driving force, into a cooling chamber where the waste material can be deposited in a waste collection container 80 as flakes, powder, or pellets of any desired size or shape by selection of the proper spray nozzle dimensions and configuration. Because the salt water is exposed to extremely high temperatures in the combustion chamber the salt recovered is sterile and free of organic matter.

Water on the order of 6 to 12 times fuel by weight is atomized into the combustion flame and vaporized in milliseconds. Salt or impurities entrained in the steam are separated from steam and then crystallized, precipitated and/or filtered leaving behind clean steam.

Salt or waste collection and removal mechanism 80 can be accomplished by any of a number of well-known means from combustion chamber 25, such as by a rotary longitudinal auger. This auger is sealed so as not to bypass much pressurized working gases as it rotates and removes the precipitated salt. As mentioned above, an alternative is to spray the molten waste or salt through spray nozzles into a collecting tower or extrude the salt 81 into strands or rods which can then be cut to desired sizes. A still further alternative is to drain the molten salt directly into molds to form salt blocks 81 which are then easy to transport and use in chemical processing reprocessed for recovery or otherwise disposed of.

The resulting working fluid, which now includes clean water steam, may be fed into one or more standard steam or gas turbines. Following work production by the expanding steam-gas mixture, a condenser 62 condenses steam 61 resulting in a source of usable potable water 65. Using this open cycle at pressure ratios of from 10:1 to 50:1 or higher electric power may be generated at good efficiencies and specific fuel consumption.

FIG. 6 shows a second embodiment of a unit using the VAST cycle. In this embodiment, the efficiency of the system is further increased by capturing additional waste heat from the combustion chamber 25. The combustion chamber 25 is enclosed in a double shell heat exchanger 90. In the version shown, the hot compressed air 11 exiting the compressor 10 passes through the shell 92 immediately surrounding the combustion chamber 25 before it enters the combustor 25. The cold water 41 is fed to a second shell 94 which surrounds the first shell 92. In this manner the air 11 absorbs additional heat normally lost from the combustor 25 and the incoming water 41 absorbs some of the heat from the compressed air 11. An additional benefit, since the air 11 is at an elevated pressure, is that the pressure differential across the combustion chamber 25 wall (i.e. the difference between the combustor interior and ambient conditions as in FIG. 5 or the difference between the combustor interior and the compressed air 11 is significantly reduced, thus reducing the stress on the combustor wall from the combination of high temperature and high pressure. The water 41, after passing through the combustion chamber outer shell 94, then proceeds through the condenser 62 and the heat exchanger 73 to acquire the desired injection temperature. Care is taken to maintain the water under pressure possibly as high as 4000 psi so that, as the water is heated, it does not convert to steam before it is injected into the combustion chamber 25 which is at a higher temperature and, in most instances, a lower pressure than the superheated water 41.

Purification of contaminated waste products or treatment of solid, liquid and gaseous waste products from commercial processes resulting in useable products with power production as a by-product are also potential applications of an engine employing the VAST cycle. Waste water from dried solid waste products may be used in the present invention, resulting in filtered, useable water as one byproduct. The combustible materials are additional fuel for burning in the combustor 25 and the inorganic dried waste products may then be used to create fertilizers. As is apparent, other chemicals can be extracted from solid and liquid products using the present invention. Sewage treatment is also an application. Other applications include water softening, steam source in conjunction with oil field drilling operations and well production, recovery and recycling of irrigation water along with fertilizer and minerals leached from the soil, municipal solid waste, etc.

2. Aircraft Engines

The VAST cycle described about, particularly when operated with recycled water, is particularly efficient and has a relatively low fuel consumption when used in commercial aircraft which normally operates at 30,000 to 40,000 feet. At such elevations ambient pressure is 0.1 to 0.25 atmospheres or lower and ambient temperature is well below 0° F. Examples 5–7 open cycle data illustrate the benefit of lowering turbine exit pressure. To generate turbine exit pressures below atmosphere, such as when operating the system at sea level, a vacuum pump on the turbine exit is necessary. This pump, which consumes energy generated by the system, reduces the usable energy and efficiency of the system.

Elimination of the turbine exit vacuum pump by operating in an environment with pressures less that atmosphere, such as at elevations greater than about 30,000 feet, increases the usable power output of the system, and therefore, reduces fuel consumption. Further, if the water in the system is to be recycled, the ambient air temperature can be used to condense and cool the exiting gas stream and separate the water for recycling reducing the amount of energy used to recover the heat.

3. Steam Generation and Steam/Power Cogeneration

It is also contemplated that the combustor and its control system, along with a suitable compressor can be used without the power turbine solely for the generation of high temperature, high pressure steam, the generation of potable water, or the recovery of valuable inorganic materials dissolved in the water. Alternatively, one or more gas and/or steam turbines sized to produce a desired amount of electrical energy can be coupled to the combustor to deliver electrical energy as well a mix of high temperature, high temperature steam as a side stream directly from the combustor.

While various embodiments of the present invention have been shown for illustrative purposes, the scope of protection of the present invention is limited only in accordance with the following claims and the spirit and scope of the appended claims should not be limited to the description of the preferred versions contained herein.

What is claimed is:

1. A process of generating power using an apparatus comprising a combustion chamber and a work engine coupled to the combustion chamber, comprising the steps of:

delivering fuel to the combustion chamber;

delivering compressed air at an elevated temperature and at a constant pressure to the combustion chamber, the amount of air being chosen so that at least about 90% of the oxygen in the air is consumed when burned with the fuel;

varying the quantity of air and fuel supplied to the combustion chamber, while maintaining a constant fuel to air ratio;

mixing the fuel and air in the combustion chamber;

igniting the mixture of fuel and air to produce a combustion vapor stream;

delivering superheated water under pressure to the combustion chamber, the water being converted substantially instantaneously upon entering the combustion chamber to steam, the delivery and formation of steam creating turbulence and mixing in the combustion chamber resulting in a working fluid comprised of steam, combustion products and non-flammable materials in the air and fuel;

controlling the quantity of water delivered to the combustion chamber such that the latent heat of vaporization of the water maintains the temperature of the working fluid at a desired level;

delivering the working fluid to the work engine; and transferring heat from the working fluid exiting the work engine to the water, the heat transferred to the water being sufficient to elevate the temperature of the water from a feed temperature to the desired temperature for delivery to the combustion chamber.

2. The process of claim 1, also including the step of delivering additional non-flammable liquid to the compressed air prior to introduction of the compressed air into the combustion chamber.

3. The process of claim 1, wherein, prior to mixing the air with the fuel, the compressed air is heated by heat radiating from the combustion chamber by passing said compressed air through a channel external to the combustion channel, at least one wall of the chamber being an outer wall of the combustion chamber.

4. The process of claim 1, wherein the step of mixing the compressed air with the fuel comprises the steps of mixing a portion of the air with the fuel prior to ignition, and adding the remainder of the air to the fuel in the combustion chamber downstream of the point of ignition.

5. The process of claim 4, further including the step of passing the compressed air through a channel external to the combustion chamber prior to mixing the air with the fuel, the channel being comprised, at least in part, of a portion of an outer wall of the combustion chamber, whereby the compressed air is heated by radiation from the combustion chamber.

6. The process of claim 1, wherein the step of mixing the compressed air and water includes the steps of:

mixing about 50% of the compressed air with the fuel in a first zone of a burner at one end of the combustion chamber prior to ignition, the resulting flame in the first zone after ignition being fuel rich;

adding about 25% of the compressed air to the fuel rich flame in a second zone of the burner downstream of the first zone subsequent to ignition;

adding about 12.5% of the compressed air to the flame in a third zone of the burner downstream of the second zone; and adding the remainder of the compressed air to the flame in a fourth zone of the burner downstream of the third zone.

7. The process of claim 6, further including the step of passing the compressed air through a channel external to the combustion chamber prior to mixing the air with the fuel, the channel being comprised, at least in part, of a portion of an outer wall of the combustion chamber, whereby the compressed air is heated by radiation from the combustion chamber.

8. The process of claim 7, wherein the working fluid exiting the work engine contains less than 3 ppm $NO_x$.

9. The process of claim 7, wherein the working fluid exiting the work engine contains less than 3 ppm CO.

10. The process of claim 7, wherein the working fluid exiting the work engine contains less than 3 ppm CO and less than 3 ppm $NO_x$.

11. The process of claim 6, wherein controlled amounts of the water are injected into the combustion chamber at multiple locations in the combustion chamber downstream from the fourth zone of the burner.

* * * * *